Figure 1:
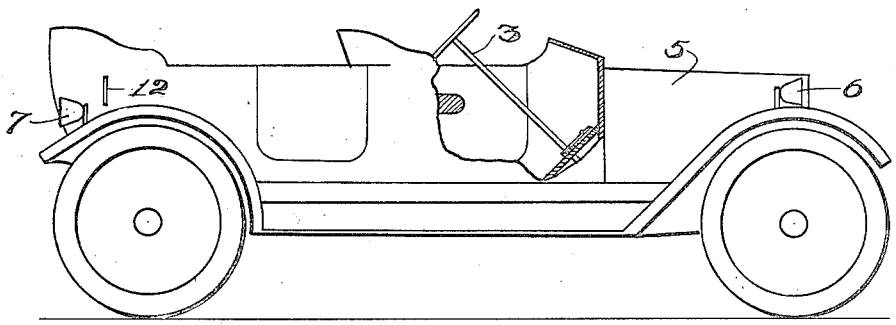

C. McK. HOSFORD.
AUTOMOBILE SIGNAL.
APPLICATION FILED MAY 4, 1915.

1,215,155.

Patented Feb. 6, 1917.
2 SHEETS—SHEET 1.

Witnesses

Inventor
C. McK. Hosford.

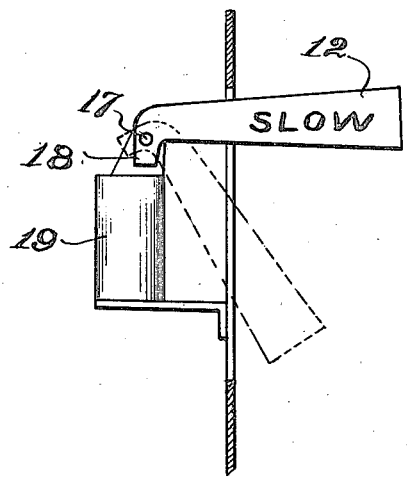
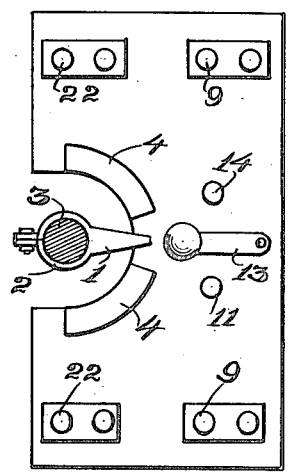
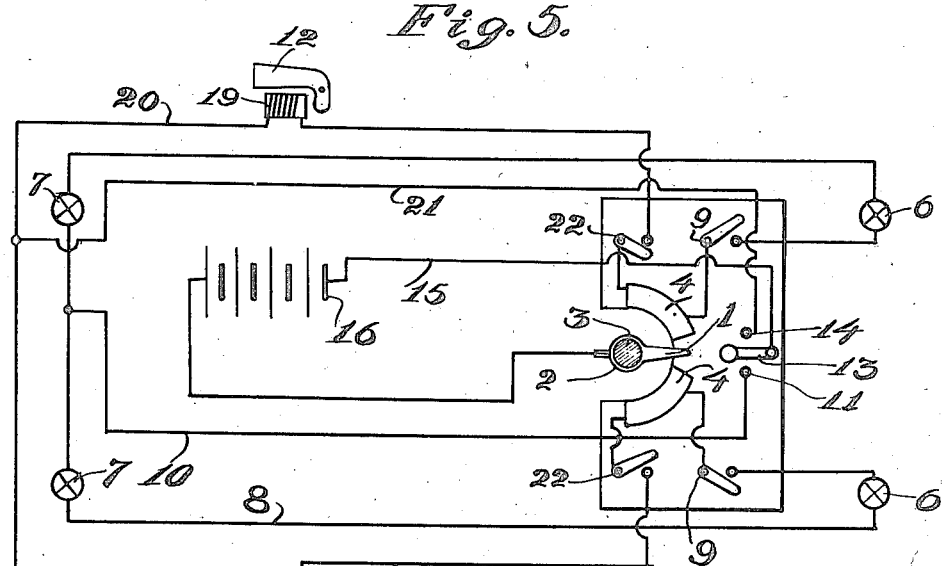

UNITED STATES PATENT OFFICE.

CHARLES McKEON HOSFORD, OF BROOKLYN, NEW YORK.

AUTOMOBILE-SIGNAL.

1,215,155. Specification of Letters Patent. Patented Feb. 6, 1917.

Application filed May 4, 1915. Serial No. 25,749.

*To all whom it may concern:*

Be it known that I, CHARLES McK. HOSFORD, a citizen of the United States, residing at Brooklyn, in the county of Kings and State of New York, have invented certain new and useful Improvements in Automobile-Signals; and I do hereby declare the following to be a full, clear, and exact description of the invention, such as will enable others skilled in the art to which it appertains to make and use the same.

The invention relates to improvements in automobile signals.

The object of the present invention is to improve the construction of automobile signals and to provide a simple, practical, and comparatively inexpensive automobile signal automatically operated by the steering wheel and adapted to display at the side of an automobile signal lamps at night and signal arms during the day for indicating to a crossing policeman and to machines in rear and others the direction in which the chauffeur intends to take.

With these and other objects in view the invention consists in the construction and novel combination and arrangement of parts hereinafter fully described, illustrated in the accompanying drawings and pointed out in the claim hereto appended, it being understood that various changes in the form, proportion and minor details of construction may be resorted to without departing from the spirit or sacrificing any of the advantages of the invention.

In the drawings

Figure 2:
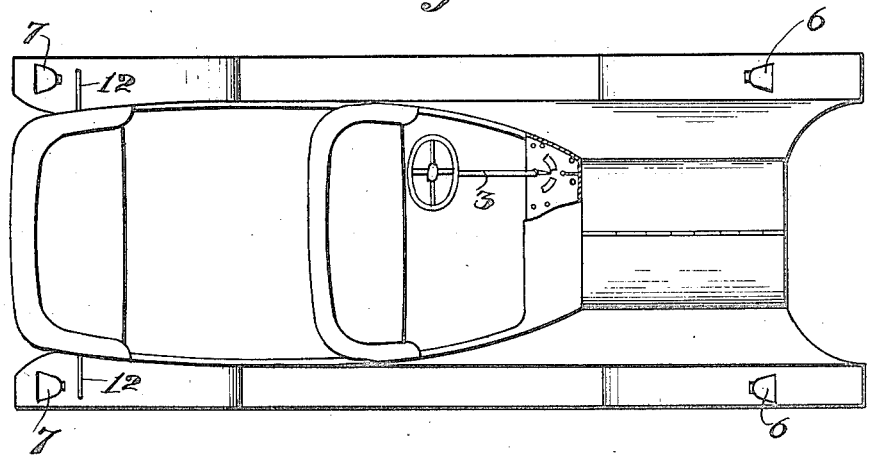

Figure 1 is a side elevation of an automobile provided with a signal constructed in accordance with this invention, Fig. 2 is a plan view of the same, Fig. 3 is a detail view of one of the signal arms and the electro-magnet for actuating the same, Fig. 4 is a detail view illustrating the construction of the main switch and the signal switch, Fig. 5 is a diagrammatic view illustrating the arrangement of the wires of the signal lamp and signal arm circuits.

Like numerals of reference designate corresponding parts in the several figures of the drawings.

In the accompanying drawings in which is illustrated the preferred embodiment of the invention, 1 designates a main switch arm provided with a split collar 2 for clamping it on the steering shaft from which it is insulated by suitable material. The main switch arm 1 is arranged to coöperate with opposite spaced arcuate contact plates 4 with which the wires of the lamp and the signal arm circuits are connected so that when the steering mechanism of the automobile is operated to turn the machine in one direction, the signal lamps or signal arm at that side of the machine will be displayed by the closing of an electric circuit by the main switch arm 1 and the side contact plates 4.

The automobile 5 or other motor vehicle is equipped at the front and rear with signal lamps 6 and 7 located at opposite sides of the machine and connected with wires 8 extending from the side contact plates 4 to the front lamps and from the front lamps to the rear lamps and across the machine between the rear lamps. Cut-out switches 9 for cutting out the lamps when desired are provided. The wire 8 of the lamp circuit is connected by a wire 10 extending from the wire 8 at a point between the rear lamps and connected at its other terminal with one of the points 11 of a signal switch for arranging the circuit to show either the lamps at night or signal arms 12 during the day.

A switch arm 13 which is movable between the point 11 and the point 14 is connected by a wire 15 with one of the poles of a battery 16 or other suitable source of current supply. When the switch arm 13 is arranged in contact with the point 11, the automobile signal is arranged for use at night and when the main switch arm of the steering shaft is moved to the right or left and brought into contact with one of the side contact plates 4 the lamps at that side of the machine will be lighted by the closing of the circuit. The arcuate contact plates are spaced apart at their front ends to provide a limited movement of the main switch arm to permit the automobile or other vehicle to be steered in a forwardly direction without operating the signals. This construction prevents any slight weaving of the wheels or slight turning movement of the vehicle from carrying the main switch arm into contact with one of the side plates, so that a positive change in the direction of the machine is necessary in order to close either of the side circuits.

The signal arms 12 which are located at opposite sides of the rear portion of the automobile but which may also be arranged at both the front and rear are mounted on suitable pivots 17 and are provided with armatures 18 extending from the pivoted ends of the signal arms at right angles to the same and arranged to be attracted by electro-magnets which are connected with wires 20 extending from the side contact plates 4 along the sides of the machine and across the back thereof. The wire 20 connecting the electro-magnets with each other is connetced with the side point 14 of the signal switch by a wire 21 which divides the wire 20 and coacts with the same to form separate side signal arm circuits which are closed by the main switch arm 1 of the steering shaft. The wires 20 of the signal arm circuit are provided with cut out switches 22 and while the wiring is preferably arranged as illustrated diagrammatically in Fig. 5 of the drawings, the wires may of course be disposed in any convenient arrangement to suit the machine to which the signals are applied. The signal lamps may be colored and the pivoted signal arms are designed to bear the word "slow" or some other warning.

It will be seen that the automobile signal is exceedingly simple and inexpensive in construction, that it is adapted to be applied to various automobiles and motor vehicles and that it is automatically operated by the steering mechanism. It will also be clear that the device is equipped with signals for use by day and by night and that either set of signals may be arranged for operation by manipulating the switch for controlling the signals.

What is claimed is:—

An automobile signal of the class described including a main switch arm designed to be mounted on the steering shaft, side contact plates arranged in the path of the steering arm, signal lamps located at opposite sides of the automobile at the front and back of the same, wires connecting the signal lamps with the side contacts, pivoted signal arms arranged at opposite sides of the automobile so as to project laterally therefrom, electromagnets for actuating the arms, wires connecting the electromagnets with the side contacts, a signal switch having a pivoted switch arm connected with a source of electric current supply and provided with opposite points connected respectively with the said wires between the side lamps and the signal arms, means for connecting the main switch arm with the source of current supply, and separate cut-out switches arranged in pairs connected with the wires of the lamps and the electromagnets for cutting out the same at either or both sides of the automobile.

In testimony whereof I affix my signature in presence of two witnesses.

CHARLES McKEON HOSFORD.

Witnesses:
 WILLIAM M. JENKINS,
 ADELAIDE HOSFORD.